United States Patent [19]

Tundermann et al.

[11] 3,709,439
[45] Jan. 9, 1973

[54] PRODUCTION OF REFLECTIVE METAL FLAKE PIGMENTS

[75] Inventors: John Hayes Tundermann, Goshen; John Herbert Harrington, Warwick, both of N.Y.

[73] Assignee: The International Nickel Company, Inc., New York, N.Y.

[22] Filed: Dec. 2, 1970

[21] Appl. No.: 94,333

[52] U.S. Cl. ..................................... 241/15, 241/30
[51] Int. Cl. ............................................. B02c 15/00
[58] Field of Search .......................... 241/15, 27, 30

[56] References Cited

UNITED STATES PATENTS

| | | |
|---|---|---|
| 1,932,741 | 10/1933 | Kramer ........................... 241/30 X |
| 2,002,891 | 5/1935 | Hall ................................. 241/15 X |
| 2,136,445 | 11/1938 | Kramer ........................... 241/30 X |
| 2,416,746 | 3/1947 | Gavin .............................. 241/30 |
| 2,764,359 | 9/1956 | Szegvari ......................... 241/15 |
| 3,337,140 | 8/1967 | Wahl ............................... 241/30 X |

*Primary Examiner*—Granville Y. Custer, Jr.
*Attorney*—Maurice L. Pinel

[57] ABSTRACT

Directed to a metal flake powder of a stain-resistant metal or alloy and a process for producing the same wherein a metal powder of −100 mesh size is ball milled in a mobile liquid medium wherein the ratio of mobile liquid to powder being milled is at least about 10 to 1, e.g., about 25:1 to about 50:1.

9 Claims, 8 Drawing Figures

PRODUCTION OF REFLECTIVE METAL FLAKE PIGMENTS

The present invention is directed to the production of metal flakes made of stain-resistant metals such as nickel, cobalt, and nickel-copper alloys, nickel-chromium alloys, etc.

The production of metal flakes of metals such as aluminum, brass and bronze has long been known and such metal flakes are known in the art as "bronze colors". Metal flakes are useful for many purposes, particularly in the production of paints, inks, and the like. Jones in his treatise *Powder Metallurgy* at pages 203 to 212 describes succinctly the history of such materials. Aluminum and brass flake powders can be produced to have the quality known as "leafing" whereby the flakes are aligned in the manner of fallen leaves at the surface of a wet paint film due to rejection from the organic paint medium or vehicle and surface tension effects. Good coverage and presentation of a metallic surface by the dried paint film are thereby obtained. Automotive finishes based upon sythetic resins which may contain a colored pigment and containing aluminum, and recently brass flake powder, have been developed which exhibit a polychromatic effect whereby, due to the presence of metal flake within the paint film, a lighter color is evident to the eye when the finish is viewed perpendicularly than when viewed at a low angle. This characteristic is referred to as "flop" in the paint industry. For this purpose "non-leafing" aluminum flake pigments are employed. Both leafing and non-leafing aluminum flake products are said to be produced in the same way, with different lubricants being used in each case. Thus, leafing pigments are coated with a lubricant film which is not wetted by the paint vehicle whereas non-leafing pigments are coated with a lubricant which is wetted by the paint vehicle.

Insofar as the production of polychromatic automotive finishes is concerned, the use of aluminum flake pigments has been found to exhibit limitations particularly in relation to the relatively poor stain-resistance of paint films containing such flake. Thus, for example, certain corrosive industrial atmospheres can produce staining or spotting of such automotive finishes during only a few hours exposure of a severity such as to require repainting of a car which is only a few weeks old. In addition, many of the synthetic resins used in compounding modern automotive finishes are degraded by light in the ultra-violet (U.V.) end of the sunlight spectrum. Since aluminum reflects approximately 90 to 95 percent of incident U.V. light, the presence of aluminum flake in such a paint film can lead to accelerated degradation of the paint, an undesirable effect.

The known drawbacks of U.V. reflectance and limited corrosion resistance which characterize aluminum flake pigments presumably should be overcome by using nickel or nickel alloy flake material, particularly a nickel-containing austenitic stainless steel such as Type 304L, since such metals are corrosion-resistant and stain-resistant and reflect less than about 50 percent, e.g., only about 10 to 40 percent, of incident U.V. light. However, it is found that presently available stainless steel and nickel flake pigments do not produce esthetically acceptable finishes for automotive use. Instead, automotive finishes made using the presently available nickel and stainless steel flake powder materials are characterized by an esthetically unpleasant, dull or muddy color tone (characterized by the word "dirty") and by limited "flop". Thus, presently available nickel or stainless steel flake pigments are not useful in applications demanding esthetic value but have been used to a limited extent in maintenance paints.

It has been found by investigation using the scanning electron microscope that presently available nickel and stainless steel flake pigments comprise particles characterized by pronounced surface roughness on the major flake faces and excessive fines which lead to a lack of specular brightness or reflectivity of the particles and which render them unsatisfactory in esthetic applications.

We have now discovered a method for producing flakes of stain-resisting metals and alloys, including nickel, nickel alloys and stainless steels which have smooth, specularly reflective surfaces, are bright and lustrous and are characterized by esthetic effectiveness in paint films and in other applications.

It is an object of the present invention to provide a method for producing flake powders of stain-resisting metals and alloys which have, in individual flake particles, specularly reflective, bright and lustrous surfaces contributing the property denoted as "flash" or "sparkle" to paint films containing such particles.

It is a further object of the invention to produce metal flake powders of stain-resistant metals which are of controlled thickness and size and have smooth, lustrous, specularly reflective surfaces.

It is a still further object of the invention to provide metal flake powders of stain-resistant metals which are capable of being suspended in liquid paint media and which provide pleasing esthetic effects when incorporated in paint films.

Other objects and advantages of the invention will become apparent from the following description taken in conjunction with the accompanying drawing in which.

Figure 7:
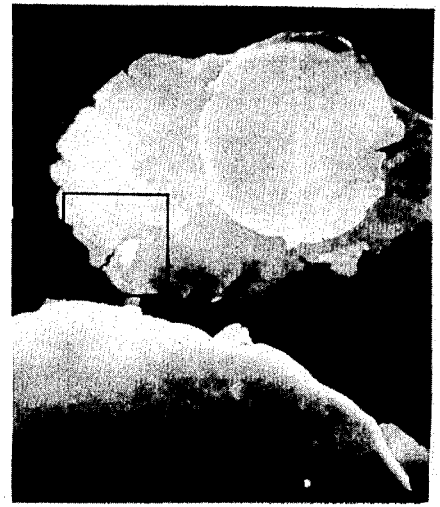
Figure 8:
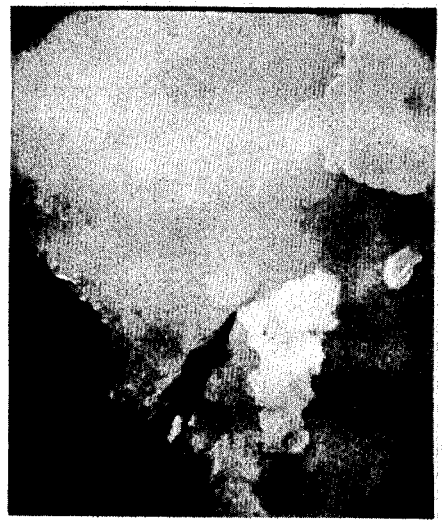

FIG. 7 is a reproduction of a photograph taken on the scanning electron microscope at 2,000 diameters of stainless steel flake having greatly improved surface smoothness produced in accordance with the invention; and FIG. 8 is a reproduction of a photograph taken at 10,000 diameters on the scanning electron microscope of stainless steel flake produced in accordance with the invention in the same field as that shown in FIG. 7.

Broadly stated, the present invention comprises a process for producing metal flake of a stain-resistant metal, which comprises milling stain-resistant metal powder in a mobile liquid medium in the presence of a group of milling or grinding bodies confined in a milling space with the volume ratio of said liquid medium to said metal powder being at least about 10:1, and more preferably at least about 20:1, or even at least about 25:1, e.g., about 25:1 to about 50:1, and with said liquid medium being present in relation to the volume of said milling or grinding bodies such that the interstitial space between said grinding bodies at rest in the confined milling space in substantially completely filled with said liquid medium. The mobile liquid is preferably mineral spirits (light liquid hydrocarbons usually having a specific gravity in the range of about 0.7 to 0.9), but may be water, isopropanol or other liquid of relatively low viscosity which may readily be removed from the flake product. Mixtures of mobile liquids may be employed. The liquid should wet the powder and the balls. A small concentration of a lubricant is also maintained in the mobile liquid environment to minimize or prevent welding of the particles being milled. The lubricant may be a saturated or unsaturated fatty acid containing between four and 26 carbon atoms, or mixtures of such fatty acids, exemplified by stearic acid, oleic acid, palmitic acid, lauric acid, ricinoleic acid, etc., including mixtures of linseed and cottonseed oils, etc. Corresponding fluorinated fatty acids may be employed as may mercaptans. It has been found from experimentation that fluorinated hydrocarbons, e.g., polyetrafluoroethylene "Teflon", do not operate as lubricants in connection with the metals treated in accordance with the invention, such that grinding and the production of large amounts of fines results when such materials are used even in amounts up to 10% by weight of the metal powder being treated. It appears that successful lubricants are not materially soluble in the mobile liquid medium, and further that successful lubricants have the capability of coating the metal flake product. Surface active agents may also be employed.

It is essential in accordance with the invention that the milling action be conducted in a mobile liquid medium. The process is carried out preferably in a conventional ball mill or in a stirred ball mill, e.g., attritor, charged with metal, e.g., steel balls, usually of substantially uniform size. A suitable ball mill is illustrated, for example, in the Hall U.S. Pat. No. 2,002,891 and an attritor mill is illustrated at page 8–26 of *Perry's Chemical Engineers' Handbook*, Fourth Edition, as well as in the Szegvari U.S. Pat. No. 2,764,359. In such a mill, the satisfactory mobile condition of the liquid medium is evidenced when the mill is discharged as by pouring out the entire contents of a ball mill, or removing one or more balls from the mill, and it is found that there is little or no coating of the balls by the powder charge.

In carrying out the process of the invention, the starting material will normally be a metal powder usually having a fine particle size, for example, a size such as to pass a 100 mesh Tyler screen (having openings measuring about 0.147 mm.), preferably having a size such as to pass a 325 mesh Tyler screen (openings measuring 0.044 mm.). Even finer starting metal powders are advantageous, although extremely fine powders, e.g., 1 micron, are undesirable as such fine powders are likely to be contaminated. In converting such powders to flake having esthetic characteristics, individual powder particles are flattened between impacting grinding balls or between the balls and the wall of the container holding them. Some comminution of the powder results, and with coarser starting powders, more comminution is necessary to provide a flake product having the thinness, e.g., an average thickness less than about 1 micron, required for esthetic uses, and to permit suspension in a liquid medium such as a paint. In order to provide flake products having smooth major faces and concomitant high specular reflectivity, it is necessary that welding of flakes together or welding of fine particles to the major faces of the flake product be limited or prevented. This is accomplished by conducting the milling in a mobile liquid medium which is dilute with respect to the powder load and by maintaining an effective concentration of a lubricant, such as stearic acid, in the milling medium. If no lubricant, or an insufficient amount of lubricant, is present in the liquid medium, the major action which results in milling is grinding. This effect can be availed of when the starting powders are undesirably coarse, with the lubricant being added to the mill after sufficient comminution has been obtained so that the flaking action will be initiated. Combinations of flaking and grinding can be employed to produce flake of desired size.

Figure 4:
FIG. 4 is a reproduction of a photograph taken on the scanning electron microscope at 10,000 diameters of a nickel flake product of greatly improved surface smoothness produced in accordance with the invention from the same field as that shown in FIG. 3.
Figure 5:
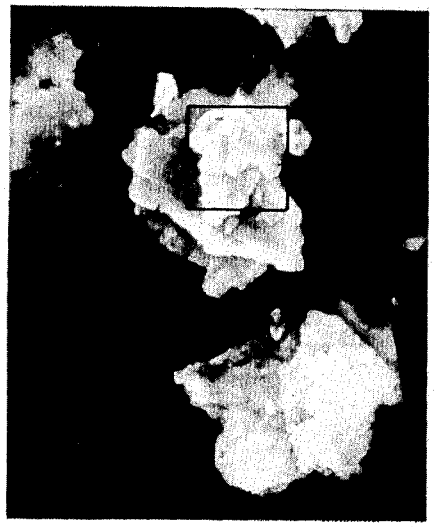
FIG. 5 is a reproduction of a photograph taken on the scanning electron microscope at 2,000 diameters of a stainless steel flake of commercial production.
Figure 6:
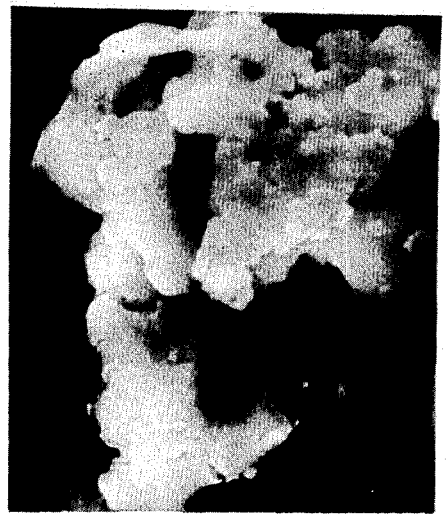
FIG. 6 is a reproduction of a photograph taken on the scanning electron microscope at 10,000 diameters of a commercially available stainless steel flake taken in the same field as that depicted in FIG. 5.

The flake product provided in accordance with the invention for use in paints will contain a major proportion of particles having an average thickness less than 1 micron and preferably less than about 0.75 microns or less than about 0.5 microns, with an average dimension across a major flake axis of about 10 to about 80 microns, e.g., about 20 to about 40 microns. For special purposes, such as for use in plastics, etc., larger flakes may be desirable and can be achieved in accordance with the invention. Thus, flake products containing a major proportion of particles having an average dimension across a major flake axis exceeding 44 to 50 microns and up to, e.g., 150 microns, can be produced. For such products, it is preferred to start with metal or alloy powders in the size range passing 100 mesh but retained on a 325 mesh screen. Such larger flake products may be several microns, e.g., up to 3 microns, thick, since such products are intended for use in media which will accept heavier particles. The specular reflectance of the particles will usually be at least about 30 percent or even 40 percent or higher, as determined by a test comprising forming a water-floated layer of the flake sample to be measured, aiming a light beam of parallel light rays, at an angle of 30° from the vertical, generated by a tungsten filament light source and measuring the specularly reflected light ($R_s$) from the beam by means of a photocell sensitive in the range 300 to 700 millimicrons wavelength. The test is nonstandard but is comparative. It is affected to an extent by the absorption characteristics of the material tested and the photocell can report light values at wavelengths which are outside the visible spectrum. The test forms a useful indication of the surface smoothness of metal flake. For example, the commercial stainless steel product depicted in FIGS. 5 and 6 of the drawing gave a specular reflectance value of about 11 percent whereas the stainless steel product of the invention as depicted in FIGS. 7 and 8 gave a specular reflectance of 48.9 percent. Again, the commercial nickel product of FIGS. 1 and 2 gave a specular reflectance of only 19.5 percent as against a reflectance of 43.7 percent for the nickel product of the invention illustrated in FIGS. 3 and 4. All the values for specular reflectance were obtained using products screened through 325 mesh so as to represent present metallic pigment practice. The specular reflectance values thus were shown to confirm the improved surface smoothness demonstrated for products of the invention by the scanning electron microscope.

As noted previously, the milling can be conducted in a conventional ball mill or in an attritor mill or in other types of grinding or milling equipment, e.g., vibratory and planetary ball mills, and the term "ball mill" is used generically herein to include mills wherein a charge of grinding balls or otherwise shaped grinding media is confirmed in a container therefor. While the milling action itself can vary depending upon the particular equipment involved, nevertheless the teachings herein are applicable and enable the production of satisfactory flake produces from stain-resistant metals.

THE CONVENTIONAL BALL MILL

For practical purposes, the conventional ball mill forms a convenient apparatus in relation to the present invention. As is known, the mill comprises a hollow cylindrical container or shell in which a charge of grinding balls, preferably substantially uniform in size and preferably substantially spherical in shape is placed. Usually the volume of the ball charge including the free space therebetween will occupy less than half of the volume of the mill. The mill is rotated about its cylindrical axis at a rotational speed sufficient to create a cascading and impacting or impinging action in the ball charge. It is desirable to provide a number of lifters fastened to the inner cylindrical wall parallel to the cylindrical axis and extending along the length of the mill so as to reduce slippage of the ball charge against the inner cylindrical mill wall. The effective impacting action of the balls which produces flake occurs in only a limited zone, i.e., the charge zone within which the cascading action of the balls occurs. As the balls are lifted due to rotation of the mill, the mobile liquid is believed to drain therefrom so that most of the liquid and most of the powder being acted upon remains in the lower portion of the mill and is available in the active zone. The mill is operated with high ball to powder volume ratios, e.g., 25:1 or 30:1 and higher.

THE ATTRITOR MILL (Stirred Ball Mill)

This mill is considered to be substantially more active in relation to grinding than the ball mill. The mill comprises an axially vertical stationary cylinder having a rotatable agitator shaft located coaxially of the mill with spaced agitator arms extending substantially horizontally from the shaft. The mill is filled with grinding elements, preferably metal, e.g., steel balls, usually of substantially uniform size, sufficient to bury at least some of the horizontal arms so that, when the agitator shaft is rotated, the ball charge, by virtue of the arms passing through it, is maintained in a continual state of unrest or relative motion throught the bulk thereof during milling. In operating the attritor mill in accordance with the invention the mill tank is filled with balls to about one to two ball diameters in height above the topmost horizontal agitator arm and the entire free space within the ball charge is filled with the mobile liquid such that the liquid covers the top of the ball charge at rest. The entire ball charge within the attritor mill is considered to be active due to the motion of the agitator arms therethrough when the mill is in operation. The attritor preferably is run at high speed to reduce operational time, and with a high ball to powder volume ratio, e.g., about 25:1 or 30:1 or higher.

It is important that a small concentration, e.g., about 0.5 percent to about 2 or 5 or 10 percent by weight of the metal powder charge, of a lubricant, e.g., stearic acid, be maintained within the mill charge during milling. The actual amount of lubricant required to be effective is dependent upon the nature of the lubricant. This is advantageously done by making small periodic additions of the lubricant during the mill run to replace that which is consumed by coating the flakes as they are formed and that which is degraded or otherwise lost during operation. It is to be appreciated that some lubricants are subject to heat degradation due to heat generated in the mill. It is preferable that the mill be cooled during operation as by employing a cooling water jacket about the attritor or by water spraying the outside of a ball mill.

As noted, the volume of mobile liquid and powder charge should fill entirely the free space formed by the ball charge at rest. Preferably the liquid to powder volume ratio, a most important parameter for purposes of the invention, is maintained in the range of about 25:1 or 30:1 to about 50:1. Lower liquid to powder ratios may be employed but the risk of producing roughened surfaces of lower specular brightness on the flake product is thereby increased. Higher liquid to powder ratios may be employed but production rate is thereby lowered, which is undesirable economically, and other detrimental effects may be encountered.

Metals or alloys which may have compositions containing, by weight, up to about 90 percent copper, up to about 10 percent manganese, up to about 3 percent molybdenum, up to about 70 percent tin, up to about 70 percent zinc, up to about 10 percent silver, and the balance essentially a metal from the group consisting of nickel, iron, cobalt, chromium and the platinum metals, usually in amounts of at least about 10 percent, may be employed in accordance with the invention. Thus the metal employed, usually in the form of a powder, may be carbonyl nickel, stainless steels of either the austenitic or ferritic type, nickel-chromium and nickel-chromium-iron alloys, nickel-copper alloys containing up to about 90 percent copper, nickel silvers containing about 15 percent to about 70 percent copper, about 10 percent to about 70 percent zinc, and the balance at least about 15 percent nickel, carbonyl cobalt, nickel-cobalt, nickel-iron and iron-cobalt alloy powders, e.g., produced by the carbonyl process, nickel-tin, silver-nickel, etc. Electrolytic chromium powder and ferro-chromium powder (70 percent chromium) have been converted to a brilliant flake. The relatively broad compositional ranges for alloys which may be converted to flake in accordance with the invention affords a wide color range in the flake powder. Thus, stainless steel flake has a greenish tint, nickel is yellowish, while nickel-copper and the nickel silvers afford pink, yellow and green/blue tints. Preferably, the metal powders treated have a melting point of at least about 1100°C. and/or a density of at least about 7.5.

The initial powders of various metals and alloys can be made by atomization, comminution, hydrogen reduction by mechanical alloying (as described in the Benjamin U.S. Pat. No. 3,591,362), and in the case of electrodepositable metals such as nickel, iron and cobalt and their alloys, may be electrodeposited coarse flake. Other practices or techniques, (e.g., metal coated powders), can be employed in producing the initial powder. Mechanically alloyed powders, which can be very hard, e.g., about 600 Vickers Pyramid Number, can be converted to flake without prior annealing or can be annealed. The initial powders preferably are as free as possible of oxides and other contaminants as such material can produce undesirable effects in paint films if not removed, and the metal and alloy powders should be as low as possible in the content of impurities which detrimentally affect malleability, e.g., sulfur, nitrogen, phosphorus, carbon, etc. In some alloys excessive amounts of silicon and/or manganese can detrimentally affect malleability.

Carbonyl nickel powder having an average particle size of about 4 to 7 microns and very low in impurity content is an ideal starting material for conversion to flake in accordance with the invention.

Figure 1:
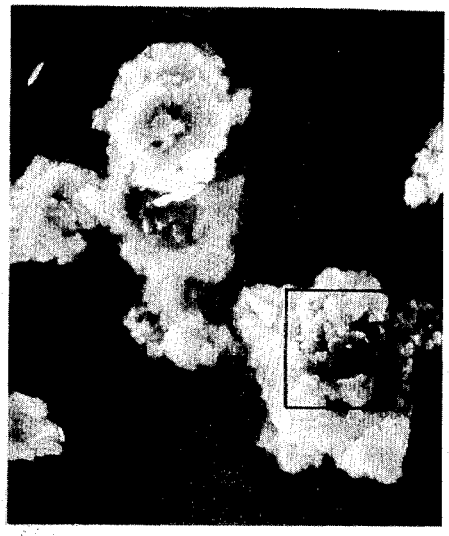
FIG. 1 is a reproduction of a photograph taken on the scanning electron microscope at 2,000 diameters of a commercially available nickel flake product.
Figure 2:
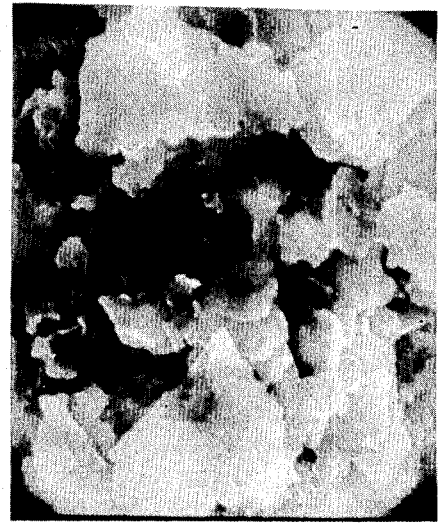
FIG. 2 is a reproduction of a photograph taken on the scanning electron microscope at 10,000 diameters of the same field shown in FIG. 1.
Figure 3:
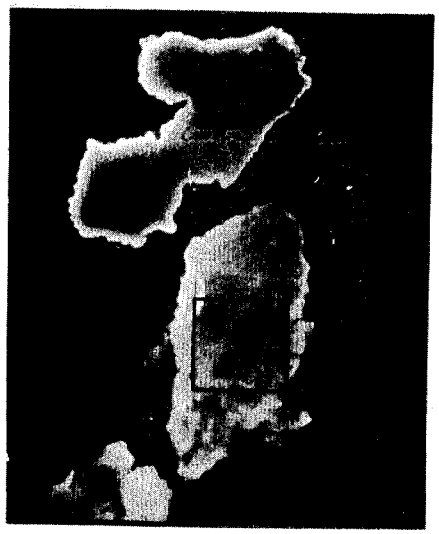
FIG. 3 is a reproduction of a photograph taken on the scanning electron microscope at 2,000 diameters of a nickel flake product of greatly improved surface smoothness produced in accordance with the present invention.

As noted, it is important that product flake have smooth major surfaces as accomplished in accordance with the invention. Comparison of, for example, FIGS. 1 and 5 in the drawing (prior art) with FIGS. 3 and 7 (this invention) dramatically illustrates the improvement in flake quality brought about by the invention. Thus, FIGS. 1 and 3 are both nickel flake products produced from carbonyl nickel powder of the same type. It is clearly evident that the product of FIG. 1 is revealed by the scanning electron microscope at 2,000 diameters as having a rough surface apparently caused by the welding together of flakes and flake fragments whereas the surfaces of the nickel flake of FIG. 3 are revealed by the same examination technique as having much smoother surfaces with essentially no welded-on fine material on the flake surfaces. In addition, the specular brightness of the FIG. 3 material was greatly improved as compared to the FIG. 1 material since this factor is a direct function of surface smoothness of the flake. A similar improvement is to be noted by comparing FIG. 7 with FIG. 5 in the case of stainless steel flake. Again, greatly improved smoothness of the major flake faces, with essentially no welded-on fine material on the flake surfaces, was provided in accordance with the invention. Comparison of the corresponding Figures taken at 10,000 diameters provides additional confirmation of the foregoing.

In order to give those skilled in the art a better appreciation of the advantages of the invention, the following examples are given:

EXAMPLE I

In this example, a ball mill was employed which was 12 inches in diameter, 5 inches long and was provided with four internal lifters ½ inch square fastened at 90° spacings over the full cylindrical face of the mill parallel to the cylindrical axis. The mill was charged with 15 kilograms of 5/16 inch diameter steel balls, 300 grams of carbonyl nickel powder of about 4 to about 7 microns average size, 1120 milliliters of mineral spirits (a light liquid hydrocarbon "Amsco Mineral Spirits 66/3" similar in viscosity to kerosene and having a specific gravity of about 0.771) and 1.5 grams of stearic acid. The mill was rotated for 10 hours at 45 r.p.m. with further 0.75 gram additions of stearic acid being made after 4 and 7 hours running time. The ball to liquid volume ratio was 1.7:1, the ball to powder volume ratio was 57:1 and the liquid to powder volume ratio was 33.5:1. At the end of the run the mill was discharged, the flake product removed from the liquid by decantation and evaporation, and the product was washed. Thickness, specular reflectance and size range of the flake product were determined with the results set forth in Table I. The flake product was bright and lustrous and was satisfactory for use in esthetic applications such as automotive finishes, when screened to remove material exceeding about 44 microns.

EXAMPLE II

In this example, an attritor mill having a tank diameter of 20 centimeters and 20 centimeters in depth and provided with a water jacket was employed. The mill was provided with a vertical agitator arm having five horizontally extending cross-arms substantially evenly spaced therealong and angularly offset 90° from each other. A charge of 22.5 kilograms of 5/16 inch diameter steel balls was placed in the mill, thereby covering the uppermost agitator arm by a depth of about one to two ball diameters. 2600 milliliters of mineral spirits of the type described in Example I, 562 grams of carbonyl nickel powder of about 4 to about 7 microns average size and 3.51 grams of stearic acid lubricant were then placed in the mill. The liquid to carbonyl nickel powder volume ratio was about 41.5:1; the ball to liquid volume ratio was about 1.09:1; and the ball to carbonyl nickel powder volume ratio was about 45.6:1. The liquid level at rest was sufficient to cover the level ball charge to a depth of about 4 centimeters. The mill was then run for 6 hours at the maximum speed of 275 r.p.m. After two hours and again after four hours, additional 1.75 gram amounts of stearic acid were added. The total lubricant concentration employed was about 1.25 percent by weight of the powder. At the end of the run the liquid and flake product were discharged from the bottom of the mill, separated by decantation and evaporation, and the product was washed. The thickness, specular reflectance and size range of the flake product were determined with the results set forth in Table I. Optical examination indicated that the flake product was bright and lustrous and was satisfactory for use in esthetic applications such as automotive finishes. The product powder was examined by means of the scanning electron microscope at 2,000 and 10,000 diameters, and photographs were taken which are depicted, respectively, as FIG. 3 and FIG. 4 of the drawing. Scanning electron microscope examination revealed that the flake product produced in accordance with this example was indeed flat, bright and lustrous and had essentially no welded-on fine material. The light edging about the flake which is particularly evident in FIG. 3, is an effect due to the slight penetration of the electron beam into the metal and indicates that the edges of the flake are indeed very thin. Comparison of FIGS. 3 and 4 of the drawing with FIGS. 1 and 2, respectively, which represent commercial production nickel flake produced from the same raw material, demonstrates conclusively the change in the nature of the flake product brought about in accordance with the present invention when examined at the same magnification. Thus, it is clear by comparing FIGS. 1 and 2 of the commercial production flake with FIGS. 3 and 4, that the commercially produced nickel flake material in fact comprises an agglomeration of flake-like particles which have a rough welded-on surface and which correspondingly have poor specular reflectance.

EXAMPLE III

A further attritor mill run was made as set forth in Example II using a charge comprising 410 grams of atomized and "cocostream" processed Type 304L stainless steel powder having an average particle size less than 10 microns (Fisher Sub-Sieve Size) an initial addition of 2.56 grams of stearic acid and a running time of 6 hours. The liquid to powder volume ratio was about 55:1. Further additions of 1.28 grams each of stearic acid were made after 2 and after 4 hours running time. The resulting flake product was separated as set forth in Example II and the thickness, specular reflectance and size range thereof were determined with results set forth in Table I. Optical examination indicated that the flake product was bright and lustrous and was satisfactory for use in esthetic applications such as automotive finishes. The bright and lustrous nature of the flake product is clearly evident from FIGS. 7 and 8 of the drawing which are electron micrographs taken on a scanning electron microscope at 2,000 and 10,000 diameters, respectively. FIGS. 7 and 8 clearly depict the fact that the flake product produced in accordance with this example was substantially entirely devoid of welded-on fines. This feature of the stainless steel flake product produced in accordance with the invention is also demonstrated by the high specular reflectance obtained thereon as is set forth in Table I. The nature of the special flake product produced in accordance with the invention is even more clearly emphasized by comparison with FIGS. 5 and 6 of the drawing which are, respectively, scanning electron photomicrographs produced at 2,000 and 10,000 diameters of a commercial stainless steel flake product. It is to be seen that the commercial flake product is rough and comprises an aggregation of welded-together particles.

EXAMPLE IV

The procedure set forth in Example II was again carried out employing a charge of 535 grams of a nickel-silver powder produced by atomization and "cocostream" processing and having a particle size of less than about 10 microns as determined by the Fisher Sub-Sieve Sizer. The powder contained about 16.8 percent nickel, about 19.8 percent zinc, about 0.056 percent carbon, about 0.41 percent iron, about 0.54 percent oxygen and the balance copper. A liquid to powder volume ratio of about 42:1 was employed. An initial addition of 3.35 grams of stearic acid was made to the charge with subsequent additions of 1.68 grams each being made after 2 and at 4 hours running time. At the end of the 6-hour run, the flake product was recovered in accordance with the procedure described in Example II, and the thickness, specular reflectance and size range of the product were determined with the results set forth in Table I. Optical examination indicated that the flake product was bright and lustrous and was satisfactory for use in esthetic applications such as automotive finishes.

EXAMPLE V

The procedure of Example I was repeated using 285 grams of a 90 percent copper, 10 percent nickel atomized alloy powder having a particle size passing 200 mesh. An initial addition of 1.42 grams of stearic acid was employed, with a further addition of 0.72 grams of stearic acid being added at the 4th hour of the 10-hour run. The flake product was recovered in the manner described in Example I, and was checked for thickness, specular reflectance and size range with the results set forth in Table I. The flake product was bright and lustrous and was satisfactory for use in esthetic applications such as automotive finishes when screened to remove material exceeding about 44 microns.

EXAMPLE VI

The procedure of Example I was again repeated using a charge of 290 grams of −200 mesh atomized 80 percent nickel, 20 percent chromium alloy powder. A liquid to powder volume ratio of about 31.5:1 was employed. An addition of 0.42 grams of stearic acid was made to the charge and a further addition of 2.83

TABLE I

| Example No. | SIZE—MICRONS* | | | | | | Average** Thickness Microns | Surface** Area m²/gm | Specular** Reflectance −1% |
|---|---|---|---|---|---|---|---|---|---|
| | −5 | −10 +5 | −20 +10 | −44 +20 | −74 +44 | +74 | | | |
| I | 0.5 | 0.6 | 22.6 | 63.7 | 4.7 | 7.9 | 0.27 | 1.64 | 43.7 |
| II | 0.8 | 4.5 | 44.7 | 46.4 | 2.0 | 1.6 | 0.32 | 0.91 | 43.7 |
| III | 0.7 | 4.0 | 16.0 | 13.2 | 27.6 | 38.5 | 0.67 | 0.47 | 48.9 |
| IV | 0.2 | 1.4 | 26.2 | 40.4 | 10.6 | 21.2 | 0.72 | 0.47 | 38.9 |
| V | 1.9 | 2.8 | 33.1 | 42.5 | 7.5 | 12.2 | 0.36 | 0.98 | 38.9 |
| VI | 0 | 0.2 | 20.9 | 22.0 | 10.3 | 46.6 | 0.94 | 0.47 | 50.1 |

*Determined by a wet screening technique.
**Determined on product screened through a screen having 44 micron openings.
Note: The thickness measurements were calculated from water coverage measurements for which the values were, respectively, for Examples I through VI, 4160, 3540, 1920, 1560, 3120 and 1240 square centimeters per gram.

grams of stearic acid was made after seven hours running. The mill running time was 12 hours. At the end of the run the flake product was recovered in accordance with the procedure set forth in Example I, and the thickness, specular reflectance and size range of the flake product were determined with the results set forth in Table I. The flake product was bright and lustrous, and was satisfactory for use in esthetic applications such as automotive finishes when screened to remove material exceeding about 44 microns.

Comparative staining tests using commercially compounded automotive finish paint to which commercial aluminum flake and stainless steel flake products of the invention had been incorporated respectively demonstrated improved spotting resistance at room temperature for the paint containing the stainless steel flake product of the invention. Thus, painted steel panels made using a paint containing aluminum flake were stained by drops of dilute water solutions of hydrochloric acid (10 percent water solution of concentrated ACl), of liquid soap, of sodium hydroxide (5 percent solution) and of sulfuric acid (10 percent solution) whereas the corresponding painted panels made using a paint containing the stainless steel flake product of the invention were unaffected in the same test. In the test, drops about one inch in diameter were applied to the panels and left thereon for about 0.5 hours at room temperature. Improved corrosion and stain resistance for the flake products of the invention were thereby demonstrated.

It is to be appreciated that in a milling operation of the type described herein, countless numbers of individual particles are involved and that the process is statistical and time dependent. Observation of the milling process demonstrates that some flake is formed almost immediately, while the balance of the charge is still unaffected. Further contacts of such flake with grinding balls and the mill wall can only result in greater reduction in flake thickness, with the possibility of producing fines. Accordingly, the objective in a batch-type process is to maximize paint pigment product of 10 to 40 microns while minimizing oversize and undesirable fines. This is accomplished by controlling the length of run. Since flake of desired thinness can be removed from the liquid medium by rejection therefrom, the invention also contemplates continuous operation using a plurality of mills in series, e.g., an attritor mill followed by a ball mill. In series operation, classification of product flowing from one mill to a subsequent mill in the series can be accomplished by combinations of operations including rejection of flake from the liquid to be fed to a finishing mill and appropriate classification to reject fines and screening to recover oversize material for recycling to the first mill in the series. It is to be understood that any particular lubricant employed in the flaking operation can be removed from the flake and a different coating applied thereto using conventional techniques.

The flake products of the invention are useful not only in polychromatic automotive finishes where their flash and sparkle are esthetically attractive, but also in other types of paints including water-base paints and in plastic products such as floor tile, wall panels and extrusions for decorative effect. They are also useful in maintenance paints. In addition, the high surface to volume ratio exhibited by such flake products suggest use in catalytic applications, battery flake, as well as glass, ceramics, etc.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. The process for producing metal flakes from metal powder made of a stain-resisting metal or alloy thereof which comprises milling a charge of said metal powder in a mobile liquid medium in the presence of grinding bodies confined in a milling space with the volume ratio of said liquid medium to said metal powder being at least 10:1 to about 50:1 and with substantially all of the interstitial space between said grinding bodies when at rest in said milling space being filled with said liquid medium, said medium also containing a small amount of a lubricant effective to coat the flake product.

2. The process in accordance with claim 1 wherein said metal powder has a particle size passing about 100 mesh and said milling is continued until the thickness of at least a substantial proportion of said metal powder charge is reduced below about 1 micron.

3. The process in accordance with claim 1 wherein said metal powder charge is a metal or alloy having a composition containing by weight up to about 90 percent copper, up to about 10 percent manganese, up to about 3 percent molybdenum, up to about 70 percent zinc, up to about 70 percent tin, up to 10 percent silver, and the balance essentially a metal from the group consisting of nickel, iron, cobalt, chromium and the platinum metals.

4. The process in accordance with claim 3 wherein said metal has a melting point of at least 1100°C.

5. The process in accordance with claim 3 wherein said metal has a density of at least 7.5.

6. The process in accordance with claim 1 wherein said milling is carried out in a ball mill.

7. The process in accordance with claim 1 wherein the volume ratio of said liquid medium to said metal powder is at least 20:1.

8. The process in accordance with claim 1 wherein the volume ratio of said liquid medium to said metal powder is at least about 25:1.

9. The process for producing metal flakes from metal powder made of metal selected from the group consisting of nickel, iron, cobalt, chromium, the platinum metals, nickel-copper alloys, nickel-silver alloys, stainless steels, nickel-chromium alloys, nickel-chromium-iron alloys, nickel-cobalt alloys, nickel-iron alloys, iron-cobalt alloys, nickel-iron-cobalt alloys, nickel-tin alloys and silver-nickel alloys, which comprises milling a charge of said metal powder in a mobile liquid medium in the presence of grinding bodies confined in a milling space with the volume ratio of said liquid medium to said metal powder being at least 10:1 to about 50:1 and with substantially all of the interstitial space between said grinding bodies when at rest in said milling space being filled with said liquid medium, said medium also containing a small amount of a lubricant effective to coat the flake product.

* * * * *